United States Patent Office 3,382,263
Patented May 7, 1968

3,382,263

PROCESS FOR PRODUCING ARENE METAL CARBONYLS

Roy L. Pruett, Charleston, John E. Wyman, St. Albans, W. Va., and Donald R. Rink and Leo Parts, Buffalo, N.Y., assignors to Union Carbide Corporation, a corporation of New York No Drawing. Filed Sept. 12, 1958, Ser. No. 760,576
5 Claims. (Cl. 260—429)

This invention relates to organo-metallic carbonyls. More particularly, this invention relates to a process for producing arene transition metal carbonyls.

Bis(arene)organo - metallic compounds in which two aromatic hydrocarbon groups are bonded to each metal atom, for example bis(toluene)chromium and bis(benzene)molybdenum, have been prepared. Such compounds and a method for their production are described in several published articles by E. O. Fischer and coworkers. See, for example, Z. Naturforshung 10(b), 665 (1955); Chem. and Ind. 1956, 153; Z. Anorg. Allgem. Chem. 286, 142 (1956); ibid, p. 146; Ber. 89, 1805 (1956); ibid, p. 1809 and Angew. Chem. 68, 462 (1956). The organic groups of the bis(arene)metal compounds of the published articles include only hydrocarbon groups, such as benzene, mesitylene and tetrahydronaphthalene.

We have now discovered a process for producing organo-transition metal addition compounds wherein only one arene organic group is bonded to each metal atom and wherein the arene organic group may contain any of a wide variety of chemical elements and functional groups. The compounds produced by the process of this invention are arene metal carbonyls, for example benzene chromium tricarbonyl and ditoluene dimanganese tetracarbonyl.

According to the process of this invention, an arene organic compound containing the benzenoid ring system and a transition metal carbonyl are reacted either in solution or in the vapor phase. For example, aniline and tungsten hexacarbonyl may be reacted in the liquid phase to produce aniline tungsten tricarbonyl, $$(C_6H_5NH_2)W(CO)_3$$

The arene organic compounds which are useful in the process of this invention are those which contain the benzenoid ring system. Such compounds may be conveniently designated by the symbol Ar. The benzenoid ring system is the six-carbon, unsaturated ring which may be represented by the structural formula:

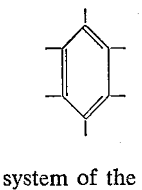

The benzenoid ring system of the compounds Ar may be substituted with a wide variety of functional groups, for example hydrogen, alkyl, aryl, aralkyl, alkaryl, alkenyl, alkoxy, aryloxy, alkhydroxy, hydroxyl, amino, N-alkyl amino, N,N-dialkylamino, halogeno, aldehydo, nitro, cyano, acyl, sulfhydryl, alkylsulfonyl, arylsulfinyl, carboalkoxy, carboxamido, carboxyl and sulfonamido.

Therefore, the arene organic compounds useful in the process of this invention may be represented in more detail by the formula:

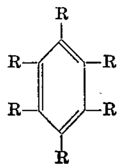

wherein the R groups may be the same or mixed and may be hydrogen and other benzenoid ring system substituents such as alkyl, aryl, aralkyl, alkaryl, alkenyl, alkoxy, aryloxy, alkhydroxy, hydroxyl, amino, N-alkyl amino, N,N-dialkylamino, halogeno, aldehydo, acyl, carboalkoxy, carboxamido, carboxyl and the like.

The bonding between the metal atom and the arene organic group takes place through six electrons of the benzenoid ring system of the arene organic group. This type of bonding is discussed in more detail in an article by E. O. Fischer and H. P. Kogler, Angew. Chem. 68; 462 (1956). The substituents on the benzenoid ring system therefore be of such size and number that the benzenoid ring may approach the metal atom sufficiently closely to permit stable bond formation to take place. For example, tertiary-butylbenzene chromium tricarbonyl and hexamethylbenzene chromium tricarbonyl are stable compounds and may be prepared by the process of this invention, but 1,3,5-tritertiary-butylbenzene chromium tricarbonyl is too unstable to permit isolation because the three bulky tertiary butyl groups do not permit the benzenoid ring system to approach the chromium atom sufficiently closely for stable bond formation to take place.

The organo-metallic compounds of the present invention may be characterized as addition compounds in contrast to organo-metallic substitution compounds. In the latter, a hydrogen or other substituent in the organic nucleus is substituted or removed in the formation of the organometallic compound. However, no hydrogen, alkyl or other substituent is removed from or replaced on the arene organic moiety in the formation of the arene metal carbonyls of this invention.

The transition metal carbonyls useful in the process of this invention may be represented by the formula $$M(CO)_{n/2} \text{ if } n \text{ is even}$$
$$M_2(CO)_{n-1} \text{ if } n \text{ is odd}$$

wherein M is a metal carbonyl-forming transition element, $n$ is an integer defined by the equation $n=G-A$, A is the atomic number of M, and G is the atomic number of the next higher rare gas. That is, $n$ is equal to the difference between the atomic number of the rare gas next above M in the periodic classification of the chemical elements and the atomic number of M. For example, if M is cobalt, G is equal to 36 (the atomic number of the rare gas krypton), A is equal to 27 (the atomic number of cobalt, $n$ is equal to 9, and the formula becomes $Co_2(CO)_8$. Similarly, if M is tungsten, $n=86-74=12$ and the formula becomes $W(CO)_6$.

In general, the carbonyl-forming transition elements are those found in Groups VI–B, VII–B and VIII of the Periodic Table of the Chemical Elements. The elements for which metal carbonyls have been prepared and characterized are the following: chromium, molybdenum, tungsten, manganese, rhenium, iron, ruthenium, cobalt, rhodium, nickel, osmium and iridium.

The process of the present invention may therefore be represented by the equation:

$$Ar+M(CO)_{n/2}\rightarrow Ar(CO)_{n/2-3} \text{ if } n \text{ is even}$$
$$2Ar+M_2(CO)_{n-1}\rightarrow Ar_2M_2(CO)_{n-7} \text{ if } n \text{ is odd}$$

or, representing the arene organic group in more detail, by the equation:

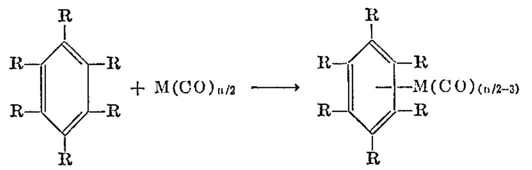

if $n$ is even

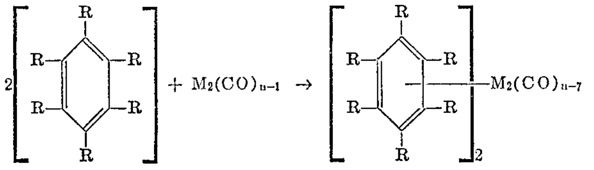

if $n$ is odd wherein Ar, R, M and $n$ have the meanings defined hereinabove. For example, when M is manganese and Ar is benzene (that is, all the R groups are hydrogen), $n=36-25=11$ and the equation becomes $$2C_6H_6+Mn_2(CO)_{10}\rightarrow (C_6H_6)_2Mn_2(CO)_4$$

Similarly, when M is molybdenum and Ar is benzene, $n=54-42=12$ and the equation becomes $$C_6H_6+Mo(CO)_6\rightarrow (C_6H_6)Mo(CO)_3$$

Additional examples of the process of this invention are the reactions of:

Toluene and nickel tetracarbonyl to form toluene nickel carbonyl; ortho-xylene and iron pentacarbonyl to form ortho-xylene iron dicarbonyl; N,N-dimethyl aniline with dicobalt octacarbonyl to form di(N,N-dimethyl aniline) dicobalt dicarbonyl; para-chloro toluene with dirhenium decacarbonyl to give di(ortho-chlorotoluene) dirhenium tetracarbonyl; and aniline with ruthenium pentacarbonyl to give aniline ruthenium dicarbonyl.

The embodiment of the process wherein the reaction takes place in the vapor phase may be conveniently carried out by passing vapors of metal carbonyl and arene organic compound through a glass, ceramic or metal tube heated to an elevated temperature. It is preferable to use a stoichiometric excess of the arene organic compound.

The temperatures of the vapor phase reaction may vary over wide limits from the vaporization temperatures of the reactants up to the decomposition temperature of the product. For $Cr(CO)_6$, $Mo(CO)_6$ and $W(CO)_6$, temperatures in the range from about 200° C. to about 300° C. give good yields of product and relatively rapid rates of reaction.

The reactant vapors may be undiluted or may be carried through the reaction zone in a stream of inert gas, such as nitrogen or argon. A total pressure of about one atmosphere is most convenient, but higher or lower pressures may be used.

In the embodiment of the process wherein the reaction takes place in the liquid phase, it is preferable to employ an excess of the aromatic reactant as a solvent for the metal carbonyl. However, the reaction between the aromatic compound and the metal carbonyl may be carried out in an inert hydrocarbon solvent, such as heptane, petroleum ether or an aromatic compound which does not form an arene metal carbonyl under the particular reaction conditions. With highly volatile metal carbonyl such as $Co_2(CO)_8$ and $Ni(CO)_4$ it is desirable but not essential to carry out the reaction in a suitable pressure vessel such as an autoclave.

In the preferred form the liquid phase reaction, a basic catalyst is added to the reaction mixture. The basic catalysts of this invention are basic, nitrogen-containing liquid organic compounds, preferably alkyl-substituted pyridines or tertiary amines such as N,N-dimethylaniline, tributylamine, 2-methylpyridine, 2,6-dimethylpyridine, 2,4,6-trimethylpyridine and triethyl amine. When aniline or a derivative thereof is a reactant, no additional catalyst is necessary. The catalyst increases the rate of reaction and thus makes it possible to carry out the reaction at a lower temperature than that required in the absence of a catalyst. Trace amounts of catalyst are effective, but larger amounts are preferred, as described hereinbelow.

The temperatures at which the liquid phase reaction may be carried out may vary over a considerable range of from 0° C. to 300° C. Temperatures in excess of the decomposition temperature of the products in the reaction medium employed should be avoided. Generally, it is preferred to employ temperatures in the range of 100° C. to 250° C.

The time necessary to carry out the reaction varies over wide limits depending on the temperature employed. The yields are not materially reduced by long time maintenance of reaction mixture under reaction conditions. Carbon monoxide gas is evolved during the course of the reaction, and it is generally preferred to maintain the reactants under the desired reaction conditions until carbon monoxide evolution essentially ceases.

The ratio of reactants is not critical and such ratios may be varied over wide limits. However, it is preferable to use the aromatic reagents in considerable stoichiometric excess, although stoichiometric amounts may be used. Further, for good yields, at least equal amounts of the metal carbonyl and catalyst should be used, although small quantities of the catalyst may also be used with success. The best yields are obtained when a considerable excess of both the catalyst and aromatic reactant are used.

When a metal carbonyl is reacted with a mixture of arene reactants, an arene metal carbonyl will form preferentially with the arene compound having the stronger electron donating group, or weaker electron withdrawing group, as a substituent. In Example 9 hereinbelow, molybdenum hexacarbonyl was heated with equal volumes of N,N-dimethylaniline and toluene. Since the dimethylamino group is a stronger electron donor than the methyl group, N,N-dimethylaniline molybdenum tricarbonyl was produced rather than toluene molybdenum tricarbonyl. Similarly, from a reaction mixture containing chromium hexacarbonyl, chlorobenzene and benzaldehyde, the compound produced would be chlorobenzene chromium tricarbonyl, not benzaldehyde chromium tricarbonyl, because the chloro group is a weaker electron withdrawing group than the aldehyde group.

The stability of the compounds produced by the process of the present invention is greatest for the Group VI–B transition elements chromium, molybdenum and tungsten. Consequently, the yields of arene carbonyls of these three elements are in general higher than for the elements of Groups VII–B and VIII. Also, the Group VI–B arene metal carbonyls do not decompose in air while the Group VII–B and VIII compounds are air sensitive. It is therefore much easier to recover the chromium group compounds from their reaction mixtures.

The process of this invention is illustrated by the following examples:

Example 1.—p-Xylene chromium tricarbonyl

One hundred milliliters of 2,4,6-trimethylpyridine, 100 ml. of p-xylene and 2.0 g. of chromium hexacarbonyl were placed in a 500 ml. round bottom flask equipped with a condenser. The reaction mixture was heated at a reflux temperature of 147° C. for a period of six hours. After cooling to room temperature, the solution was filtered and Example 15.—N,N-dimethylaniline chromium tricarbonyl Following the procedure of Example 1, 50 milliliters of N,N-dimethylaniline, 50 milliliters of toluene and 3 grams of chromium hexacarbonyl were reacted to yield yellow crystals of N,N-dimethylaniline chromium tricarbonyl.

Following the same procedure but without the use of toluene as a solvent, 50 milliliters of N,N-dimethylaniline and 3 grams of chromium hexacarbonyl were reacted to yield 2.9 grams of yellow crystals of dimethylaniline chromium tricarbonyl. This represents a yield of 82% based on $Cr(CO)_6$.

Example 16.—2-aminobiphenyl chromium tricarbonyl

Following the procedure in Example 1, 10 grams of 2-aminobiphenyl, 2 grams of chromium hexacarbonyl and 3 milliliters of toluene were reacted to yield bright yellow crystals of 2-aminobiphenyl chromium tricarbonyl.

Example 17.—Biphenyl chromium tricarbonyl

Following the procedure in Example 1, 10 grams of biphenyl, 2 grams of chromium hexacarbonyl and 50 milliliters of tri-n-butylamine were reacted to yield dark yellow crystals of biphenyl chromium tricarbonyl which melts at 80°–81° C.

Calculated for $(C_6H_5)_2Cr(CO)_3$. C, 62.0%; H, 3.5%; Cr, 17.9%. Found: C, 59.7%; H, 3.5%; Cr, 18.3%.

Example 18.—Aniline molybdenum tricarbonyl

Following the procedure of Example 1, 2 grams of molybdenum hexacarbonyl, 50 milliliters of aniline and 5 milliliters of toluene were reacted to yield yellow crystals of aniline molybdenum tricarbonyl.

Example 19.—Aniline tungsten tricarbonyl

Following the procedure of Example 1, 2 grams of tungsten hexacarbonyl and 50 milliliters of aniline were reacted to yield yellow crystals of aniline tungsten tricarbonyl which melt at 120°–121° C. with decomposition and which were identified by infrared analysis.

Example 20.—Cumene chromium tricarbonyl

Following the procedure of Example 1, 2 grams of chromium hexacarbonyl, 25 ml. of tri-n-butylamine and 100 milliliters of cumene were reacted to yield 1.5 grams of yellow crystals of cumene chromium tricarbonyl. This represents a yield of 65% based on $Cr(CO)_6$.

Example 21.—Di-ortho-xylene dimanganese tetracarbonyl

Fifty milliliters of o-xylen, 50 milliliters of tri-n-butylamine and 1 gram of $Mn_2(CO)_{10}$ were heated under reflux in an argon atmosphere for two hours. During this time carbon monoxide was evolved and the solution became deeper yellow-orange. The solvent was evaporated under reduced pressure to give a viscous red liquid which was identified as di-ortho-xylene dimanganese tetracarbonyl.

Example 22.—Alpha-methyl styrene chromium tricarbonyl

Fifty milliliters of o-xylene, 50 milliliters of tri-n-butylwith tertiary butyl catechol, 50 milliliters of tri-n-butylamine and 2 grams of chromium hexacarbonyl were placed in a 200 milliliter boiling flask which had been purged with argon. The reaction was carried out under a protective atmosphere of argon throughout. The reaction mixture was heated to boiling (170° C.) and allowed to reflux 1½ hours until carbon monoxide evolution ceased. The dark yellow solution was then stripped to dryness under a partial vacuum. A yellow crystalline solid was obtained which was recrystallized from n-heptane to obtain 0.7 gram of yellow alpha-methyl styrene chromium tricarbonyl which has a melting point of 77°–78° C. with no apparent decomposition. The structure and composition of this compound were confirmed by infrared and elemental analysis. A 30% yield based on chromium was obtained.

Example 23.—Durene chromium tricarbonyl

Two hundred (200) milliliters of 2-methylpyridine, 2.0 grams of chromium hexacarbonyl and 25 grams of durene were reacted by the process of Example 1, to yield 0.7 gram of durene chromium tricarbonyl, melting point 97°–98° C. This represents a yield of 39% based on chromium hexacarbonyl.

Example 24.—Tertiary-butylbenzene chromium tricarbonyl

One hundred milliliters (100 ml.) of 2-methylpyridine, 100 milliliters of tertiary-butylbenzene, and 2.0 grams of chromium hexacarbonyl were reacted by the process of Example 1, to yield 1.53 grams of tertiary-butylbenzene chromium tricarbonyl, melting point 78°–79° C. This represents a yield of 63% based on chromium hexacarbonyl.

Example 25.—4-methyl-2-phenyl-1,3-dioxolane chromium tricarbonyl

Fifty (50) milliliters of 4-methyl-2-phenyl-1,3-dioxolane, 150 milliliters of 2-methylpyridine, and 2.0 grams of chromium hexacarbonyl were reacted by the process of Example 1 to give 4-methyl-2-phenyl-1,3-dioxolane chromium tricarbonyl as an intractable oil.

Example 26.—Benzaldehyde diethylacetal chromium tricarbonyl

A mixture of 3.0 grams of chromium hexacarbonyl, 50 milliliters of benzaldehyde diethylacetal, and 50 milliliters of 2-methylpyridine were reacted by the process of Example 1 to give 2.1 grams of benzaldehyde diethylacetal chromium tricarbonyl, melting point 51°–52° C. This represents a yield of 50% based on chromium hexacarbonyl.

Example 27.—Benzaldehyde chromium tricarbonyl

A mixture of 1.5 grams of benzaldehyde diethylacetal chromium tricarbonyl and 35 milliliters of water containing 3 drops of concentrated hydrochloric acid was placed in a stoppered test tube under argon and allowed to react with occasional shaking for a six-hour period. The resulting orange solid was filtered in a dry box using argon as the inert atmosphere. The solid material was a mixture of benzaldehyde chromium tricarbonyl and benzaldehyde diethylacetal chromium tricarbonyl. This mixture was then shaken continuously for six hours with 30 milliliters of water containing 3 drops of concentrated hydrochloric acid in a stoppered test tube under an argon atmosphere. The following operations were conducted in a dry box using argon as the inert atmosphere. The resulting red aqueous solution containing some red oil was extracted with toluene until the aqueous layer was colorless. The toluene layer was dried over sodium sulfate, filtered and evaporated to dryness under a partial vacuum. The resulting mixture of a red oil and red crystals was recrystallized from 100 milliliters of boiling heptane, cooled in a Dry Ice bath, and filtered, affording 1.0 gram of benzaldehyde chromium tricarbonyl. This represents a yield of 83%, based on benzaldehyde diethylacetal chromium tricarbonyl.

Example 28.—N-methylaniline chromium tricarbonyl

Following the procedure of Example 1, 100 milliliters of N-methylaniline and 3.0 grams of chromium hexacarbonyl were reacted to yield 2.65 grams of yellow crystals of N-methylaniline chromium tricarbonyl which melts without decomposition at 120°–121° C. This represents an 80% yield, based on chromium hexacarbonyl. The infrared spectrum was consistent with the assigned structure.

evaporated to an oily residue by heating under partial vacuum in an oil bath at 110° C. The oily residue was then crystallized by chilling. The solid was then taken up in boiling n-heptane and 1.56 grams of yellow crystals of p-xylene chromium tricarbonyl were isolated. This represents a yield of 71% of theoretical amount based on chromium hexacarbonyl. The melting point of the product, p-xylene chromium tricarbonyl is 97°–98° C. and the infrared spectrum is consistent with the assigned structure.

Following the same procedure, 50 milliliters of p-xylene, 2 grams (0.009 mole) of chromium hexacarbonyl and 1.87 grams (0.01 mole) of tri-n-butylamine were reacted to yield yellow crystals of p-xylene chromium tricarbonyl. This represents a yield of 36% based on $Cr(CO)_6$.

Example 2.—Tetrahydronaphthalene chromium tricarbonyl

Tetrahydronaphthalene (150 ml.), 50 milliliters of 2,4,6 trimethylpyridine, and 3.0 grams of chromium hexacarbonyl were placed in a 500-milliliter round bottom flask equipped with a reflux condenser and heated at 150° to 160° C. for four hours. The reaction was carried out under an argon atmosphere. An additional 50 milliliters of tetrahydronaphthalene were added and the solution refluxed for eight hours. The solution was cooled to room temperature and evaporated to dryness under a partial vacuum. The yellow residue was dissolved in boiling n-heptane and chilled to crystallize the crude product. The yellow crystals were collected and twice recrystallized from n-heptane affording a 2.2 gram yield of yellow crystals of tetrahydronaphthalene chromium tricarbonyl, M.P. 115°–116° C. This represents a 60% yield based on $Cr(CO)_6$.

Example 3.—Toluene chromium tricarbonyl

A mixture of 100 milliliters of toluene, 100 milliliters of 2-methylpyridine, and 2.0 grams of chromium hexacarbonyl was placed in a 500-ml. flask and the reaction was carried out by the process of Example 1. Yellow crystals of toluene chromium tricarbonyl, M.P. 79°–81° C., were obtained.

Example 4.—Mesitylene chromium tricarbonyl

One hundred milliliters of mesitylene, 100 ml. of 2-methylpyridine, and 2.0 grams of $Cr(CO)_6$ were reacted by the process of Example 1, to yield 1.4 grams of mesitylene chromium tricarbonyl, M.P. 174°–175° C. This represents a yield of 60% based on $Cr(CO)_6$.

Example 5.—p-Chlorotoluene chromium tricarbonyl

Following the procedure of Example 1, 2.0 grams of chromium hexacarbonyl, 100 milliliters of 2-methylpyridine, and 100 milliliters of p-chlorotoluene were reacted to yield 1.4 grams of yellow crystals of p-chlorotoluene chromium tricarbonyl, M.P. 89°–91° C. This represents a yield of 60% based on $Cr(CO)_6$.

Example 6.—Anisole chromium tricarbonyl

Following the procedure of Example 1, 100 milliliters of redistilled anisole, 100 milliliters of 2-methylpyridine, and 2.0 grams of chromium hexacarbonyl were reacted to yield 1.52 grams of yellow crystals of anisole chromium tricarbonyl, M.P. 84°–86° C. This represents a yield of 70% based on $Cr(CO)_6$.

Example 7.—Bromobenzene chromium tricarbonyl

Following the procedure of Example 1, 100 milliliters of 2-methylpyridine, 100 milliliters of bromobenzene, and 2.0 grams of chromium hexacarbonyl were reacted to yield 0.16 gram of dark yellow crystals of bromobenzene chromium tricarbonyl, M.P. 117°–120° C. This represents a yield of 6% based on $Cr(CO)_6$.

Example 8.—Ethylbenzoate chromium tricarbonyl

Following the procedure of Example 1, 150 milliliters of triethyl amine, 50 milliliters of ethylbenzoate, and 2.0 grams of chromium hexacarbonyl were reacted to yield ethylbenzoate chromium tricarbonyl which forms an orange yellow powder, M.P. 180° C., with prior decomposition.

Example 9.—N,N-dimethylaniline molybdenum tricarbonyl

Following the procedure in Example 1, 50 milliliters of N,N-dimethylaniline, 50 milliliters of toluene and 3 grams of molybdenum hexacarbonyl were reacted to yield pale yellow crystalline N,N-dimethylaniline molybdenum tricarbonyl which decomposes without melting at 110° C.

Calculated for $C_6H_5N(CH_3)_2Mo(CO)_3$. C, 43.9%; H, 3.7%; Mo, 31.9%; N, 4.7%. Found: C, 44.6%; H, 3.6%; Mo, 32.8%; N, 4.5%.

Example 10.—Mesitylene molybdenum tricarbonyl

Following the procedure of Example 1, 2 grams of molybdenum hexacarbonyl, 4.4 grams of tri-n-butylamine and 50 milliliters of mesitylene were reacted to yield pale yellow crystalline mesitylene molybdenum tricarbonyl which decomposes without melting at 140° C.

Example 11.—N,N-dimethylaniline tungsten tricarbonyl

Following the procedure of Example 1, 50 milliliters of N,N-dimethylaniline, 50 ml. of toluene and 3 grams of tungsten hexacarbonyl were reacted to yield bright yellow crystalline dimethylaniline tungsten tricarbonyl which turns green at 160° C. and melts at 180° C. with gas evolution.

Following the same procedure but without the use of toluene as a solvent, 50 milliliters of N,N-dimethylaniline and 3 grams of tungsten hexacarbonyl were reacted to yield 2.5 grams of dimethylaniline tungsten tricarbonyl. This represents a yield of 76% based on $W(CO)_6$.

Example 12.—Aniline chromium tricarbonyl

Following the procedure of Example 1, 50 milliliters of aniline, 50 milliliters of toluene and 3 grams of chromium hexacarbonyl were reacted to yield bright yellow crystals of aniline chromium tricarbonyl which melts without decomposition at 156°–158° C.

Calculated for $C_6H_5NH_2Cr(CO)_3$. C, 47.2%; H, 3.1%; Cr, 22.7%; N, 6.1%. Found: C, 47.3%; H, 3.2%; Cr, 23.6%; N, 5.9%.

Preparation of the hydrochloride of (1) N,N-dimethylaniline tungsten tricarbonyl and (2) aniline chromium tricarbonyl: Each of the above compounds was treated in the following manner: 0.2 gram was dissolved in toluene and gaseous hydrogen chloride was bubbled through the solutions. The bright yellow, crystalline hydrochlorides precipitated. These hydrochlorides were hygroscopic and reverted to the toluene-soluble free amine metal tricarbonyls on contact with a mixture of toluene and water. The hydrochloride of N,N-dimethylaniline or aniline does not ordinarily revert to the free amine on contact with water. This shows that the complexing of the benzenoid ring by the —$M(CO)_3$ unit decreases the base strength of the free amine.

Example 13.—p-Xylene tungsten tricarbonyl

Following the procedure of Example 1, 75 milliliters of p-xylene, 2 grams of tungsten hexacarbonyl and 3 grams of tri-n-butylamine were reacted to yield bright yellow crystalline p-xylene tungsten tricarbonyl which melts with decomposition at 160°–162° C.

Calculated for $C_6H_4(CH_3)_2W(CO)_3$. C, 35.3%; H, 2.7%; W, 49%. Found: C, 34.9%; H, 3.1%; W, 50%.

Example 14.—Mesitylene tungsten tricarbonyl

Following the procedure of Example 1, 50 milliliters of mesitylene, 2 grams of tungsten hexacarbonyl and 10 cc. of triethylamine were reacted to yield 0.2 gram of yellow crystals of mesitylene tungsten tricarbonyl which sublimes at 150° C. at 1 atmosphere and decomposes above 186° C.

Example 29.—Acetophenone diethylketal chromium tricarbonyl

Following the procedure of Example 1, 50 milliliters of 2-methylpyridine, 50 milliliters of acetophenone diethylketal, and 3.0 grams of chromium hexacarbonyl were reacted to give 2.13 grams of yellow platelets of acetophenone diethylketal chromium tricarbonyl, melting point 41°–43° C. This represents a yield of 46% based on chromium hexacarbonyl.

Example 30.—Acetophenone chromium tricarbonyl

A stoppered test tube containing 1.5 grams of acetophenone diethylketal chromium tricarbonyl, 35 milliliters of water, and 3 drops of concentrated hydrochloric acid was mechanically shaken for six hours. The reddish orange solid remaining in the test tube was dissolved in toluene and the aqueous layer extracted with toluene. The combined toluene extracts were dried over sodium sulfate, and evaporated to dryness in a partial vacuum at 40° C. The red crystalline solid was recrystallized twice from heptane affording 0.8 gram of golden yellow crystals of acetophenone chromium tricarbonyl. This represents a yield of 64%, based on acetophenone diethylketal chromium tricarbonyl.

The sample of the material melted at 48°–50° C. after shaking with 40 ml. of water containing 3 drops of concentrated hydrochloric acid, washing, and drying.

Example 31.—Benzyl alcohol chromium tricarbonyl

A mixture of 50 milliliters of benzyl alcohol, 50 milliliters of 2-methylpyridine and 2.0 grams of chromium hexacarbonyl were reacted by the process of Example 1 to give 0.8 gram of benzyl alcohol chromium tricarbonyl, melting point 96°–98° C. This represents a yield of 63% based on chromium hexacarbonyl.

Example 32.—Diphenylmethane chromium tricarbonyl

A mixture of 50 milliliters of diphenylmethane, 150 milliliters of 2-methylpyridine and 2.0 grams of chromium hexacarbonyl were reacted by the process of Example 1 to give 1.52 grams of diphenylmethane chromium tricarbonyl, melting point 99°–101° C. This represents a yield of 56% based on chromium hexacarbonyl.

Example 33.—Benzoic acid chromium tricarbonyl

Ethyl benzoate chromium tricarbonyl, obtained from the reaction of 5.0 grams of chromium hexacarbonyl, 100 milliliters of triethylamine, 100 milliliters of 2-methylpyridine, and 100 milliliters of ethyl benzoate, was added to a solution of 5.0 grams of potassium hydroxide in 45 milliliters of water and the mixture allowed to stand for 3 days at room temperature. The yellow solution, which did not contain unreacted ethyl benzoate chromium tricarbonyl, was filtered and acidified with concentrated hydrochloric acid after the addition of about 20 grams of ice. The resulting cloudy orange solution was then extracted with ether (three 50 milliliter portions), the other extracts dried after washing with distilled water (three 50 milliliter portions), and evaporated to dryness in partial vacuum. The resulting orange-yellow solid was dissolved in the minimum amount of ether and evaporated to dryness in a stream of argon to give benzoic acid chromium tricarbonyl. The compound was obtained as an orange-red solid, soluble in aqueous base, insoluble in heptane and water, difficulty soluble in benzene and very soluble in ether.

Example 34.—Toluene chromium tricarbonyl

Vapors of $Cr(CO)_6$ and toluene were passed through a Pyrex tube heated to a maximum temperature of 340° C. Yellow crystals of toluene chromium tricarbonyl began to collect at the downstream end of the reaction tube when the temperature reached 220° C. The rate of reaction appeared to increase up to 250° C. where a chromium mirror began to form on the walls of the reaction tube. A total of 1.3 grams of $Cr(CO)_6$ was vaporized and passed through the tube, yielding 0.8 gram of yellow toluene chromium tricarbonyl. This represents a yield of 59% based on $Cr(CO)_6$.

The compounds produced by the process of this invention may be used to deposit a metallic mirror on various substrates. All of the compounds of this invention can be decomposed by employment of temperatures in excess of 400° C. to form a metallic film or coating on materials such as glass, glass cloth, resins and metals. The metallic coatings provide electrically conducting coatings for such substances as glass cloth and provide corrosion resistant coatings for metals.

For coating glass cloth, a quantity of an arene metal carbonyl produced by the process of this invention is sealed in an evacuated glass tube with a strip of glass cloth which has previously been dried in an oven at 150° C. for one hour; the tube is then heated to about 400° C. for one hour, cooled and opened. The glass cloth increases in weight by up to about 0.01 gram per gram of glass cloth and has a resistivity of approximately 2 ohms per centimeter. Thus, a conducting cloth may be prepared which is useful for the reduction of static charge.

For example, a piece of thin copper wire about 43 millimeters long, a piece of sapphire rod 3 millimeters in diameter and 22 millimeters long, and a rectangular piece of glass cloth about 50 x 20 millimeters average dimension were placed in a 30 millimeter O.D. glass tube 2 feet long. A glazed porcelain boat containing 1 gram of toluene chromium tricarbonyl was placed in the tube which was then purged with argon and heated to 300° C. The boat was then pushed into the hot zone. After 45 minutes, a chromium plate was deposited on the objects as well as on the walls of the tube, and toluene was condensing on the cool downstream end of the tube.

The glass cloth had attained a very dark metallic luster and would conduct an electric current. The copper wire had a dull, even coating of chromium metal over its entire length. The sapphire rod had an even, bright, shiny surface coating of chromium metal and this chromium plate had a resistance of 150 ohms from one end to the other.

The alkenyl substituted compounds produced by the process of this invention may also be used to prepare light sensitive polymers. Such polymers are useful in preparing paper suitable for photo reproduction. For example, alpha-methyl styrene chromium tricarbonyl (0.3 gram 0.001 mole), and 0.5 gram (0.005 mole) of styrene catalyzed with a few crystals of 1,1'-azo-bis-1-cyclohexane nitrile were placed in an argon purged reaction vessel. The reaction was carried out in an inert atmosphere of argon throughout. The reaction mixture was heated to 110° C. for three hours at which time the reaction mixture was nearly solid. The styrene-alpha-methyl styrene chromium tricarbonyl copolymer was taken up in toluene. The toluene, styrene-alpha-methyl styrene chromium tricarbonyl copolymer mixture was added to about 150 milliliters of methanol and the polymer filtered out. Analysis of the product corresponds to one alpha-methyl styrene chromium tricarbonyl molecule per 5.25 styrene molecules. The copolymer softens at about 140° C. and changes from yellow to green on exposure to light.

The manganese compounds of this invention, for example ditoluene dimanganese tetracarbonyl, are soluble in motor fuels used in internal combustion engines, and when added to such fuels produce an increase in the octane rating of the fuel mixture.

What is claimed is:

1. A process for the production of toluene chromium tricarbonyl which comprises mixing together toluene, 2-methyl-pyridine and chromium hexacarbonyl and heating said mixture at a temperature between about 100° C. and about 250° C. until toluene chromium tricarbonyl is produced.

2. A process for the production of para-chloro-toluene chromium tricarbonyl which comprises mixing together para-chlorotoluene, 2-methylpyridine and chromium hexacarbonyl and heating said mixture at a temperature between about 100° C. and about 250° C. until para-chlorotoluene chromium tricarbonyl is produced.

3. A process for the production of para-xylene tungsten tricarbonyl which comprises mixing together para-xylene, tri-n-butylamine and tungsten hexacarbonyl and heating said mixture at a temperature between about 100° C. and about 250° C. until para-xylene tungsten tricarbonyl is produced.

4. Process for the production of stable arene metal carbonyls by the reaction of an arene organic compound with a transition metal carbonyl at a temperature between about 0° C. and about 300° C., which process is represented by the equation

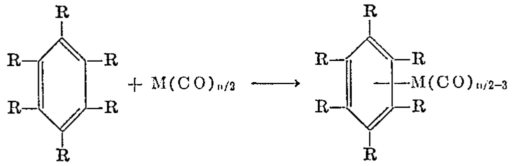

if $n$ is even, and by the equation

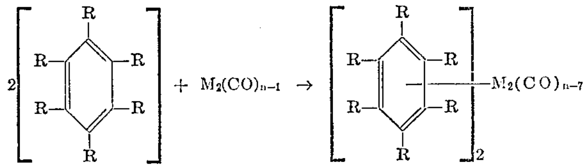

if $n$ is odd, wherein:

(1) M is a carbonyl-forming transition metal selected from metals of Groups VI–B, VII–B and VIII of the Periodic Table;
(2) each R group is selected from the class consisting of hydrogen, alkyl, aryl, aralkyl, alkaryl, alkenyl, alkoxy, aryloxy, alkhydroxy, hydroxyl, amino, N-alkyl amino, N,N-dialkylamino, halogeno, aldehydo, acyl, carboalkoxy, carboxamido and carboxyl;
(3) $n$ is an integer defined by the relation $n=G-A$;
(4) A is the atomic number of M;
(5) G is the atomic number of the next higher rare gas with respect to said metal M and
(6) in the reaction product, each metal atom is bonded to only one arene organic group;

wherein said arene organic compound is in the liquid phase and the reaction mixture contains a catalyst selected from the group consisting of primary amines, secondary amines, tertiary amines, pyridine and alkyl-substituted pyridines.

5. A process for the production of stable arene metal carbonyls by the reaction of an arene organic compound with a transition metal carbonyl at a temperature between about 100° C. and about 250° C., which process is represented by the equation

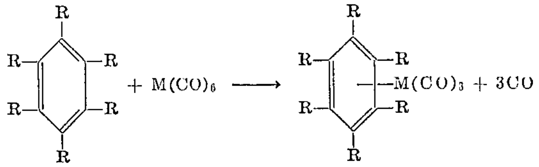

wherein:

(1) M is selected from the group consisting of chromium, molybdenum and tungsten;
(2) each R group is selected from the class consisting of hydrogen, alkyl, aryl, aralkyl, alkaryl, alkenyl, alkoxy, aryloxy, alkhydroxy, hydroxyl, amino, N-alkyl amino, N,N-dialkylamino, halogeno aldehydo, acyl, carboalkoxy, carboxamido and carboxyl; and
(3) in the reaction product, the metal M is bonded to the arene organic group;

wherein said arene organic compound is in the liquid phase and the reaction mixture contains a catalyst selected from the group consisting of primary amines, secondary amines, tertiary amines, pyridine and alkyl-substituted pyridines.

References Cited

UNITED STATES PATENTS

| | | | |
|---|---|---|---|
| 2,409,167 | 10/1946 | Veltman | 260—439 |
| 2,916,505 | 12/1959 | Shapiro | 260—429 |

OTHER REFERENCES

Natta et al.: La Chimica e l'Industria Milano, vol. 40, pp. 287–289, April 1958.

Nicholls et al.: "Proceedings of the Chemical Society" (London), p. 152, May 1958.

Fischer et al.: "Ber. Deut. Chem.," vol. 90, No. 11, Nov. 30, 1957, pp. 2532 and 2535 relied on.

Fischer: "Angew. Chem.," vol. 69, p. 715, Nov. 21, 1957.

TOBIAS E. LEVOW, *Primary Examiner.*

ABRAHAM H. WINKELSTEIN, *Examiner.*

B. D. WIESE, L. BROWN, W. J. VAN BALEN, H. M. S. SNEED, *Assistant Examiners.*